United States Patent [19]

Matsuda et al.

[11] Patent Number: 4,668,987
[45] Date of Patent: May 26, 1987

[54] APPARATUS FOR BAND COMPRESSION PROCESSING OF A PICTURE SIGNAL

[75] Inventors: Kiichi Matsuda, Kawasaki; Toshitaka Tsuda, Yokohama; Toshihiro Homma, Yokohama; Hiroshi Fukuda, Yokohama; Takeshi Okazaki, Kawasaki; Shin-ichi Maki, Yokohama, all of Japan

[73] Assignee: Fujitsu Limited, Kanagawa, Japan

[21] Appl. No.: 710,380

[22] Filed: Mar. 11, 1985

[30] Foreign Application Priority Data

Mar. 9, 1984 [JP] Japan ................... 59-44969

[51] Int. Cl.4 .................. H04N 7/12; H04N 7/18
[52] U.S. Cl. .................... 358/136; 358/105; 358/138
[58] Field of Search ............... 358/105, 133, 135, 136, 358/138

[56] References Cited

U.S. PATENT DOCUMENTS 4,047,221  9/1977  Yasuda et al. .............. 358/136
4,383,272  5/1983  Netavali et al. ............ 358/105 X
4,460,923  7/1984  Hirano et al. .............. 358/136
4,597,010  6/1986  Carr ....................... 358/136

Primary Examiner—E. A. Goldberg
Assistant Examiner—Patrick W. Foster
Attorney, Agent, or Firm—Staas & Halsey

[57] ABSTRACT

An apparatus for band compression processing of a picture signal which generates forecasting error signal and movement vector and updates only the movement vector during a comb-out operation. During comb-out processing, a picture signal is recirculated while the movement vector is produced and accumulated. At the end of the comb-out processing, the change in the movement vector from the accumulated vector is within a desired range. Therefore, the scale of a circuit for detecting the movement vector after the comb-out operation does not increase.

11 Claims, 18 Drawing Figures

APPARATUS FOR BAND COMPRESSION PROCESSING OF A PICTURE SIGNAL

BACKGROUND OF THE INVENTION

The present invention relates to an apparatus for band compression processing of a picture signal by a movement compensation encoding system and, more specifically, to an apparatus for movement compensation encoding of a picture signal that has been subjected to comb-out processing.

In a movement compensation encoding system, a picture signal is transmitted in accordance with a movement vector which represents quantity and direction of movement for each block. The movement vector is obtained by detecting the optimum position where a difference is minimized between frames(or fields) for the blocks. The blocks are obtained by segmentation of each frame of the picture signal, and differences between corresponding, preceding and successive blocks on a time axis are related to each other by the movement vector. Such an encoding system has an advantage in that compression of picture information can be done efficiently, particularly in a moving picture, by comparing picture elements in one picture with the same elements in the next picture and transmitting only the differences. The advantage is particularly apparent when compared with an interframe difference encoding system using band compression.

FIG. 1(a) is a block diagram of a movement compensation encoding apparatus of the prior art and FIG. 1(b) is a profile for explaining the movement within the screen and the operation of encoding by such an apparatus. In FIG. 1(a), picture signal blocks are applied to a movement vector detector 1 for comparison with a previous signal stored in a frame memory 5 to generate a movement vector $V_{opt}$ through detection of the quantity and direction of picture movement. At the same time, the picture signal is applied to a subtractor 2 via a delay circuit 100 and a difference is genefated by subtraction of a forecasted value sent from a variable delay circuit 6. This difference is quantized by quantizing circuit 3, which generates a forecasted error signal which is output through buffer 7. The reason for quantizing the difference signal is as follows. A broad bandwidth is generally required to transmit the difference signal between each picture signal. In order to reduce the necessary bandwidth, the difference signal is quantized and then transmitted. It is generally necessary to quantize finely when an absolute value of the difference signal is small, and to quantize roughly when the absolute value of the difference signal is large, as is shown in FIG. 1(d), when compressing a signal. The forecasted error is regenerated by decoder 9 and then applied to adder 4 and a decoded picture signal is generated by addition of the forecasted value sent from the variable delay circuit 6 to the forecasted error. The decoded signal is delayed for as long as one frame in a sequential frame memory 5 and, thereby, the decoded picture signal for the previous frame is regenerated. The variable delay circuit 6 outputs a forecasted value having the smallest difference from the input picture signal from among the forecasted values sent from the frame memory 5 in accordance with a delay which changes depending on the movement vector $V_{opt}$.

FIG. 1(e) is a block diagram of the variable delay circuit 6 and FIG. 1(f) shows a correlation between a memory address of the variable delay circuit and its output data. For example, assuming the size of the picture block is 3×3 and a sphere or range of the movement vector is between the limits of $-6 \ldots +6$ in both vertical and horizontal directions. Data from the frame memory 5 is applied to a flip-flop (FF)603, an output of FF603 is applied to a FF602 and, in the same way, an output of FF602 is applied to a FF601. After all data for the vertical direction (in this case, 3 items of data) is stored in the FF604, 605 and 606, an output control signal is applied to those FF604, 605 and 606 to enable and each data item to be applied to memories 612, 613 and 614. Counter 619 counts a number of vertical lines within a block of the picture (see FIG. 1(f)) from 1 to 3 while counter 618 counts a memory address X and counter 617 counts a memory address Y (see FIG. 1(f)).

These counters can consist of TTL IC S163 and counter 619 counts data items $D_{HEX}$, $E_{HEX}$ and $F_{HEX}$. Counter 618 counts a horizontal number of data items for the picture signal and, for example, assuming the number of the horizontal data items is 455, it counts E39 ... FFF$_{HEX}$. Counter 617 counts B ... F$_{HEX}$ data items in the same way. When the output signal of counter 619 becomes $F_{HEX}$, FF604, FF605 and FF606 have applied thereto an output control signal (OC) from a NAND circuit 621. At the same time, memories 612, 613 and 614 have applied thereto a writing signal (WE) from the NAND circuit 621.

FF625, FF626, inverter 627 and NAND circuit 628 differentiate a synchronizing signal and output a pulse signal which has one clock period. Therefore, when the outputs of these circuits are synchronized, output of the NAND circuit 628 becomes "0" and is provided to load terminals (LD) of counters 617, 618 and 619. Then selectors 629, 630 and 631 output predetermined value signals for synchronization by counters 617, 618 and 619. During the time the synchronizing signals are not provided from NAND circuit 628, counters 617, 618 and 619 are provided with $B_{HEX}$, $E39_{HEX}$ and $D_{HEX}$ signals, respectively, from selectors 629, 630 and 631 and are preset by ripple-carry signals RC via inverters 632, 634 and 636 and AND gates 633, 635 and 637.

The output signal of the counter 618 is added to the output signal of AND circuit 622 at adder 620 and is applied to memory circuits 612, 613 and 614 via FF611 as an address X signal. During the writing period for the memory circuits 612, 613 and 614, one of the input signals of the AND circuit 622 becomes "0". Therefore, vector H signal of the movement vector from FF610 is not applied to adder 620. During the reading period of the memory circuits 612, 613 and 614, the output of NAND circuit 621 becomes "1" and the output signal of the counter 618 is added to the vector H of the movement vector. Therefore, the address X is displaced by the vector H.

The output signals of counter 617 and AND circuit 623 are applied to ROM 615 which provides memory circuits 612, 613 and 614 with address Y signal via FF611. During the writing period for the memory circuits 612, 613 and 614, one of the input signals to the AND circuit 623 becomes "0"; therefore, the output signal of the AND circuit 623 becomes "0" and ROM 615 outputs an address Y according to a signal from counter 617. During the reading period for the memory circuits 612, 613 and 614, the output signal of NAND circuit 621 becomes "1" and AND circuit 623 outputs a signal from FF610, vector $\bar{V}$. Then, output signals of ROM 615 and address Y, change according to the vector $\bar{V}$.

The output signals of memory circuits 612, 613 and 614, which are read according to the address X and Y, are latched to FF607, FF608 and FF609. Clock signals to FF607, FF608 and FF609 delays two clock pulses, compared with clock signals to FF601, 602, 603, 604, 605, 606, 610 and 611. Counters 617, 618 and 619, and clock signals to FF607, FF608 and FF609 are synchronized the OC (output control) signals to the FF604, FF605 and FF606 and the WE (writing) signals to the memory circuits 612, 613 and 614. Data signals are latched into FF607, FF608 and FF609 and output according to OC signals from ROM 616 as the forecasted signal. This forecasted signal is subtracted, as shown in FIG. 1(a), from the picture signal in the subtraction circuit 2 in order to generate a difference. Thus, a movement vector which provides the smallest forecasted error within a cycle of control is multiplied along with the forecasted error before they are output.

FIG. 1(b) indicates movement of an object with respect to time t. The vertical lines i, ii, iii, iv, . . . indicate successive pictures, showing that the objects of encoding are sequentially changing positions as indicated by the arrow marks for each picture. In the encoder of FIG. 1(a), the encoding process is carried out for generating the movement difference for each picture.

In the encoder shown in FIG. 1(a), the forecasted error signal is stored in the buffer 7 and it is read out at the rate of the transmission path. However, when a large amount of picture information is generated, resulting in the possibility of buffer overflow, the so-called comb-out processing is carried out, so that encoding is not executed on a part of a frame and, therefore, an encoded output is not generated.

When such comb-out processing is executed, movement discrepancies become more distinctive or obvious between a picture for which the encoding has been performed and a picture for which the encoding is to be carried out next than in the case where encoding is carried out from picture to picture. Therefore, when the comb-out processing is carried out by the encoder shown in FIG. 1(a) and, for example, if the encoding processing skips to picture iv from picture i, the range for detecting the movement vector by obtaining the optimum position in the picture iv, as shown by A in FIG. 1(c), is much wider than the range for which the optimum position should be obtained when the encoding is carried out picture by picture.

In the apparatus of FIG. 1(a), the wide range over which detection of a movement vector must be made results in a large circuit for a comparator and is not desirable. As described above, the movement compensating encoding system of the prior art has a problem in that the size of apparatus is increased when it attempts executing the comb-out processing.

SUMMARY OF THE INVENTION

It is an object of the present invention to provide an apparatus which does not allow enlargement of the range necessary for movement vector detection, when the interval between encoding pictures changes due to comb-out processing when executing movement compensation encoding and, thereby, preventing an increase in the scale of the circuit.

According to the present invention, there is provided an apparatus for band compression processing of a picture signal, which comprises forecasting error signal generation means for generating a forecasting error signal from a difference between an input picture signal and a forecasted value, movement vector generation means for generating a movement vector from a comparision between reference blocks of the input picture and comparision blocks of the preceding picture, and update means, operatively connected to the movement vector generation means, for updating an initial value of the movement vector to accumulate movement vectors during a comb-out operation. During the accumulation of the movement vectors, a picture signal is recirculated so that the range of the movement vector generated at the end of the comb-out processing does not exceed a desired range.

These, together with other objects and advantages, which will become subsequently apparent, reside in the details of construction and operation, as more fully hereinafter described and claimed, reference being had to the accompanying drawings forming a part hereof, wherein like numerals refer to like parts throughout.

DESCRIPTION OF THE PREFERRED EMBODIMENTS

Figure 2A:
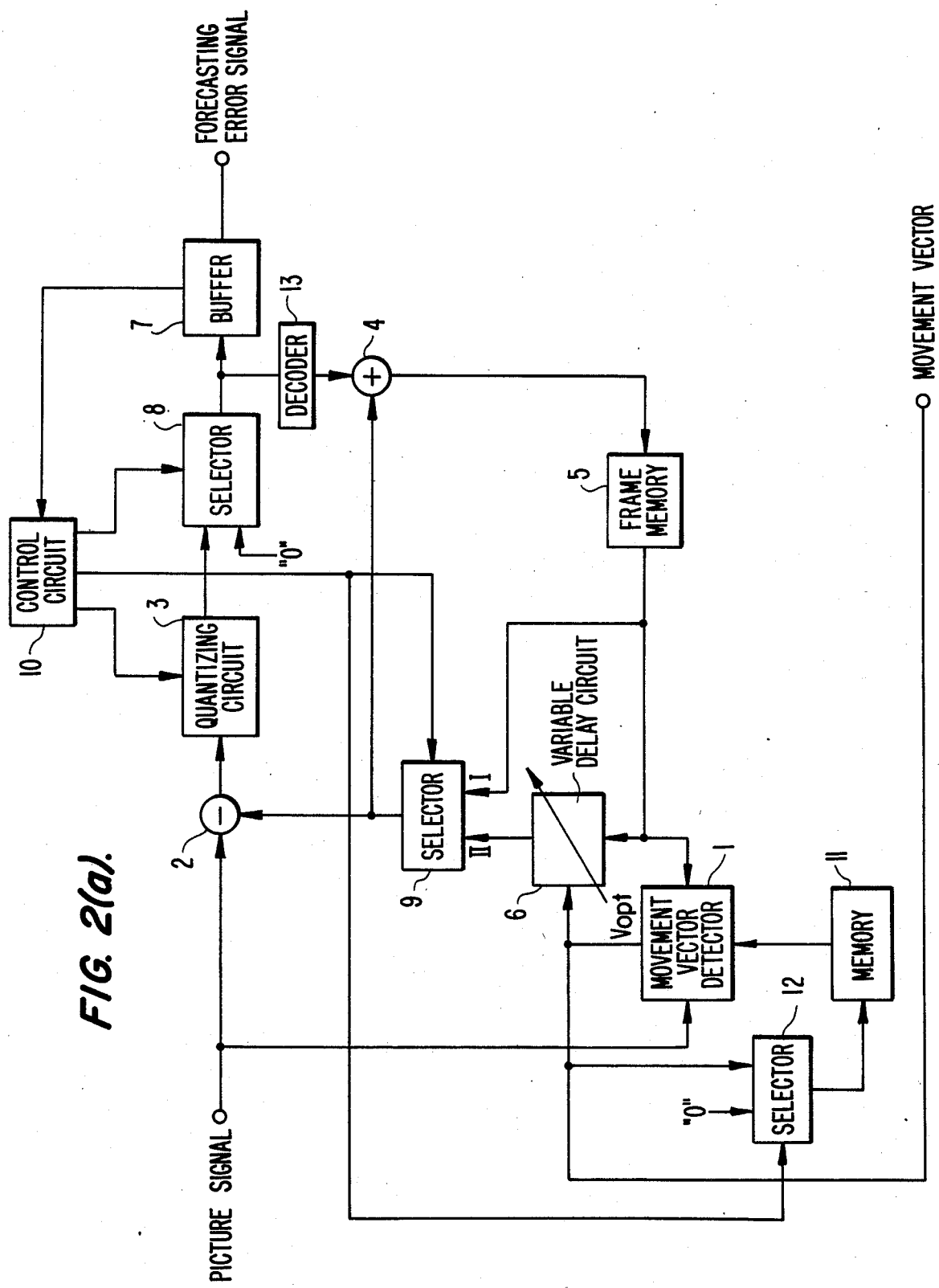
FIG. 2(a) is a block diagram of an embodiment of the present invention.
Figure 2B:
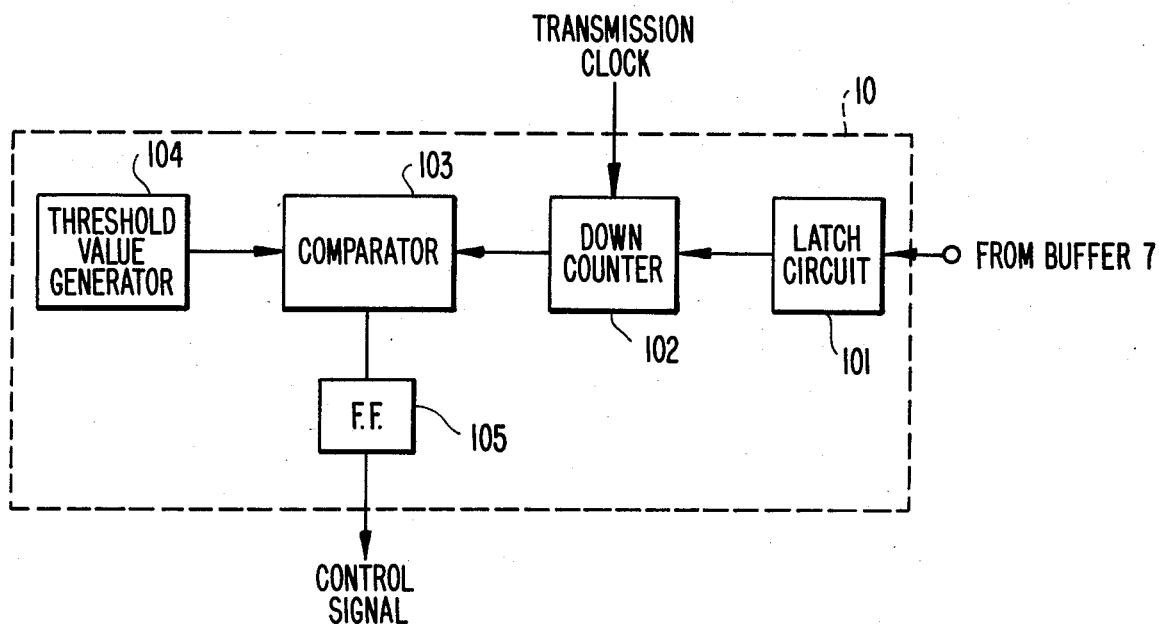
FIG. 2(b) is a diagram of a control circuit of FIG. 2(a)
Figure 2C:
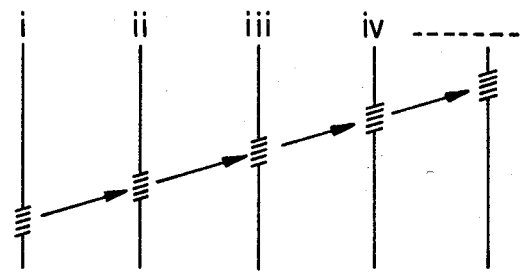
FIGS. 2(c) and 2(d) illustrate movement of an object between successive pictures and computations of movement vectors.
Figure 2D:
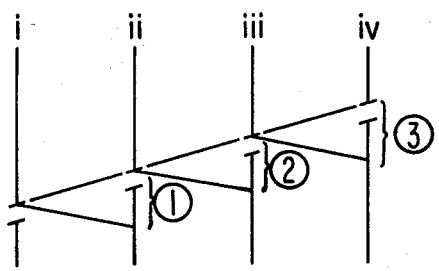

FIG. 2(a) illustrates an embodiment of the movement compensating encoder of the present invention while FIGS. 2(c) and 2(d) show movement of the object in the picture and during the encoding operation of the present invention.

Figure 1A:
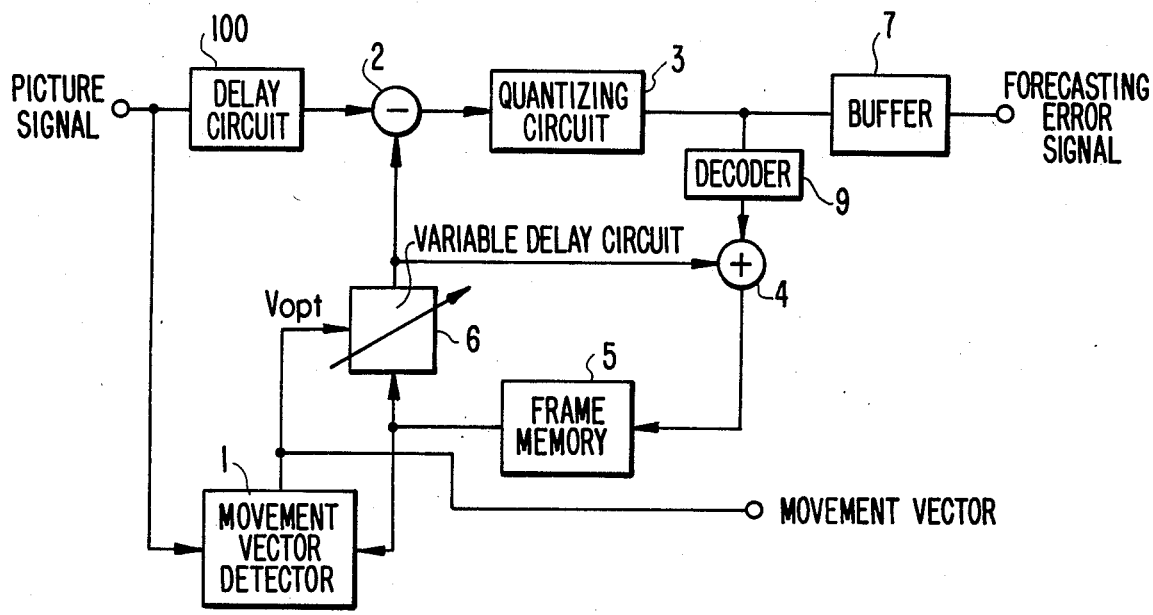
FIG. 1(a) is a block diagram of a movement compensation encoding system of the prior art.
Figure 1B:
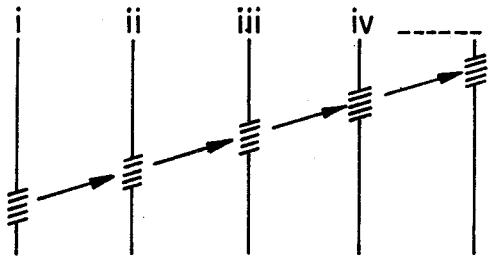
FIGS. 1(b) and 1(c) illustrate movement of an object between successive pictures and the range necessary for movement vector detection when intervening pictures are not encoded for the system of FIG. 1(a)
Figure 1C:
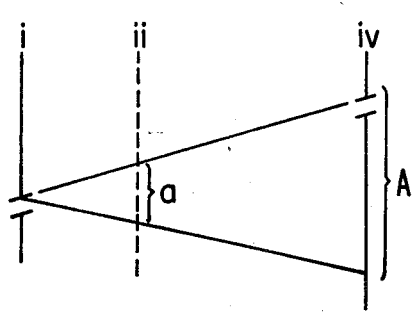
Figure 1D:
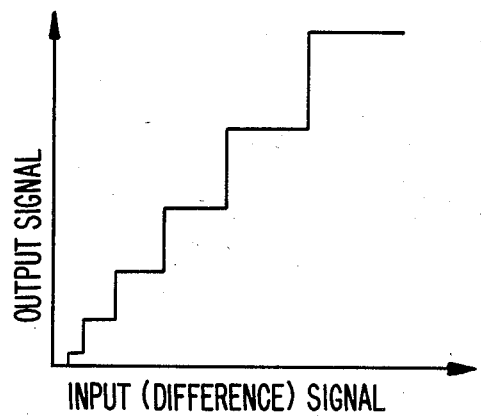
FIG. 1(d) is an input-output characteristic of a quantizing circuit 3 of FIG. 1(a)
Figure 1F:
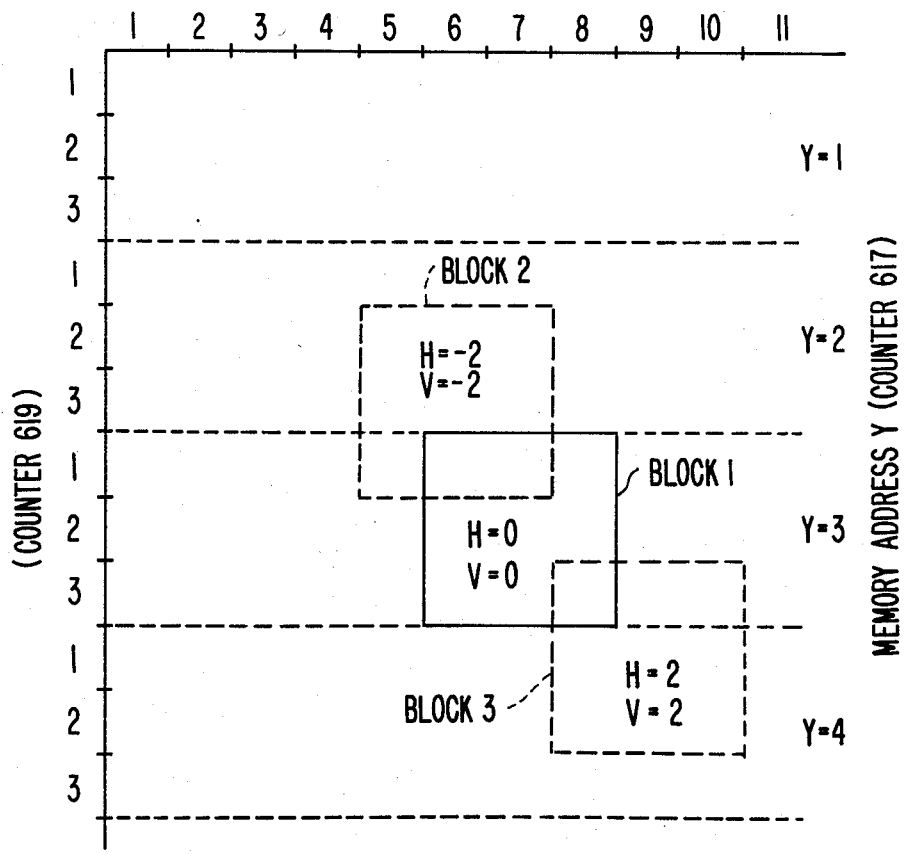
FIG. 1(f) shows an example of a relationship between addresses X and Y of the memory circuits 612, 613 and 614 (FIG. 1(e)) and movement of picture blocks.
Figure 1E:
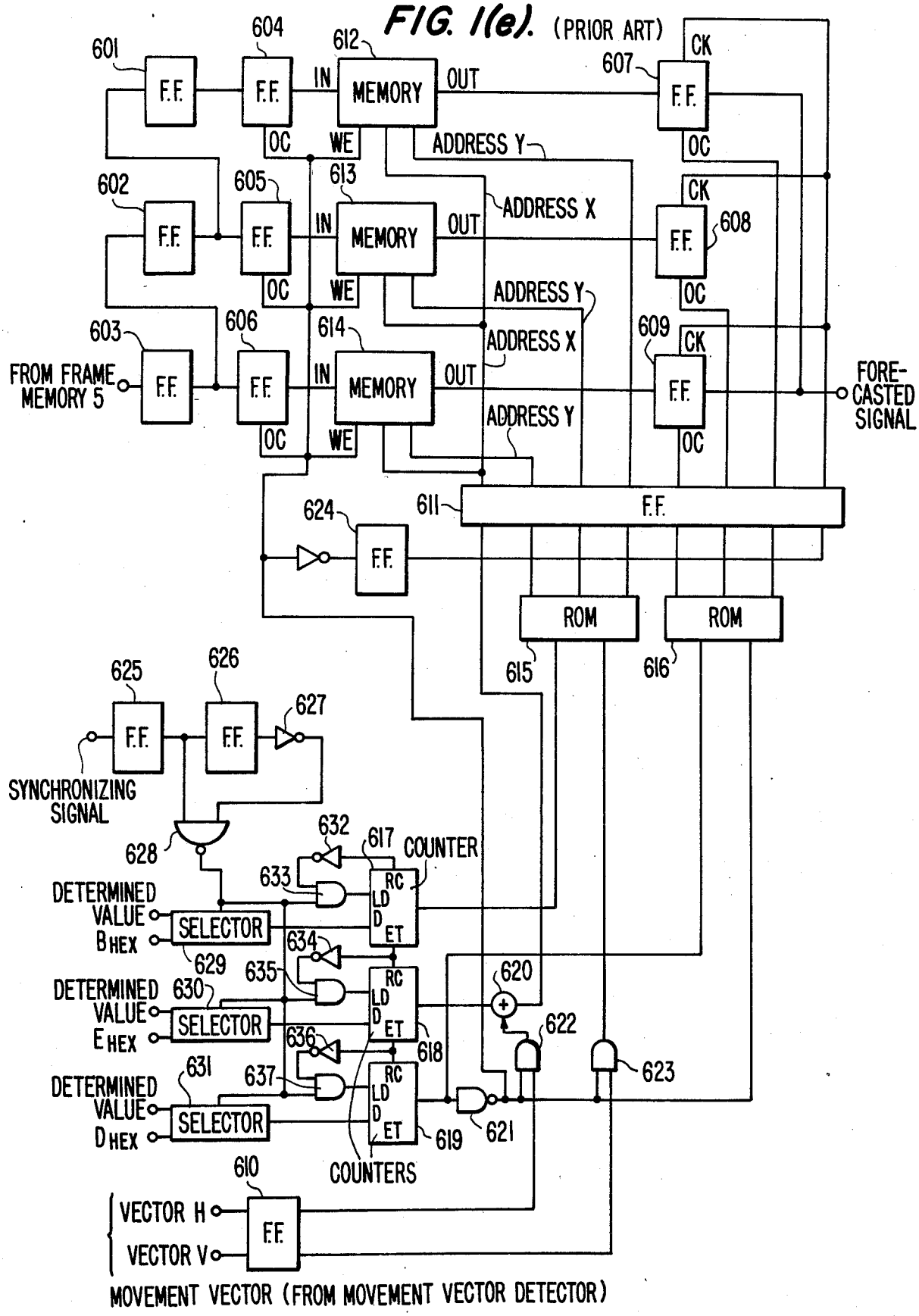
FIG. 1(e) is a block diagram of a variable delay circuit 6 of FIG. 1(a)

In FIG. 2(a), the control circuit 10 monitors the overload condition of buffer 7, switches selector 8 to the quantizing circuit 3, selector 9 to the variable delay circuit 6 and switches selector 12 to the side of a "0" input when an overload occurs. The operation of the circuit shown in FIG. 2(a) when no overflow condition exists is the same as explained with respect to FIG. 1(a).

FIG. 2(b) illustrates a block diagram of the control circuit 10. The control circuit detects an overflow condition of the buffer 7 and outputs a control signal to selectors 8, 9 and 12 and quantizing circuit 3. At first, the control circuit 10 latches an information value (BOC), which is generated by the encoding process of one time period, from buffer 7 into latch circuit 101. Then, the information value (BOC) is loaded into down counter 102. Down counter 102 counts down using a transmission clock. The output of the down counter 102 is compared with a predetermined threshold value from threshold value generator 104 by comparator 103. The threshold value is related to a value or number of data bits which can be transmitted in one frame time. If the output signal of the down counter 102 becomes less than the threshold value, the comparator 103 outputs a control signal "1". The control signal is synchronized by FF105 and then sent to selectors 8, 9, 12 and quantizing circuit 3.

The control signal "0" from control circuit 10 switches the selector 8 to output a signal of level "0", switches the selector 9 to the frame memory 5 and switches the selector 12 to the movement vector detector 1. In this condition, the comb-out process is possible. In this situation, no encoding is carried out and, therefore, an encoding output is not generated and the preceding picture information is circulating through the frame memory 5. At this time, the movement vector detector 1 compares the incoming picture signal with the picture signal from frame memory 5 and the movement vector $V_{opt}$ is produced by detecting the quantity and direction of movement and the vector $V_{opt}$ is stored in the memory 11 through the selector 12.

When the next picture signal is input, the movement vector detector 1 compares the picture signal input with the picture signal of frame memory 5 to detect the quantity and direction of movement and generates a movement vector $V_{opt}$. In this case, the movement vector detector 1 selects the reference blocks in the frame memory 5 with the movement vector for the previous picture stored in the memory 11 used as the initial value and the movement vector value is obtained by adding a movement value of the current picture to that of the preceding picture within the specified range with respect to this selected block. While the comb-out processing is carried out as explained above, the movement vectors are sequentially accumulated.

When encoding is later carried out, the selector 8 is switched to the quantizing circuit 3, while the selector 9 is switched to the variable delay circuit 7 and the selector 12 to the "0" input and simultaneously the quantizing circuit 3 is switched to an operating condition. In this situation, the movement vector detector 1 compares the input picture signal with the picture signal for the previous decoded picture which is stored in the frame memory 5 to detect the quantity and direction of movement. Thereby, the movement vector $V_{opt}$ is generated. In this case, a movement vector value is equal to the value accummulated during the period of comb-out processing plus the latest detected movement vector value. Simultaneously, since "0" is input to the memory 11 through the selector 12, the value stored in memory 11 does not vary. The variable delay circuit 6 generates a forecasted value by delaying the decoded signal in accordance with an amount of delay which changes depending on the movement vector $V_{opt}$. However, the decoded signal, in this case, the encoded signal, is shifted in position by the accummulated value of the movement vector accumulated during the comb-out processing period from the position of the picture signal when the previous encoding has been conducted. The subtractor 2 subtracts this decoded signal from the picture signal input, generates a forecasted error and outputs it as the quantized forecasted error through the quantizing circuit 3. Meanwhile, the movement vector detector 1 outputs the movement vector value accummulated between the previous picture encoding and the present picture.

FIG. 2(c) shows movement of the object with respect to the passage of time x. The vertical lines i, ii, iii, iv . . . show the successive pictures in which the object changes sequentially in position as indicated by the arrow mark for each picture. In the encoder shown in FIG. 2(a), the processing for obtaining the movement vector is carried out for each picture as shown in FIG. 2(c) and the movement vector values are accumulated.

In the apparatus of FIG. 2(a), as described above, since the movement vector values during the comb-out processing are accumulated and the calculation of forecasted error is carried out in accordance with such accummulated value during the next encoding period, the range for detection of the movement vector always falls within the range of the change expected for each picture to obtain the optimum position. As a result, the range for which the optimum position is obtained and the area in which movement vector detection must be performed is not enlarged during the next encoding period after the comb-out operation mode, which is different from the prior art.

Figure 3:
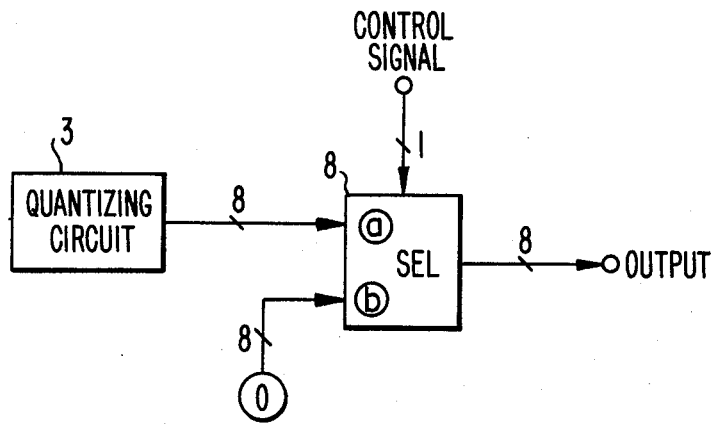
FIG. 3 shows an example for making "0" the forecasted error signal applied to selector 8 of FIG. 2(a) during comb-out processing.

FIG. 3 shows an example of the structure of a circuit for setting the forecasted error output of selector 8 to "0" during the comb-out operation of the apparatus of FIG. 2. During the normal mode (that is, when comb-out processing is not performed), the selector 8 is switched to terminal a when "1" is applied as the control signal, the 8-bit signal sent from the quantizing circuit 3 is output through the selector 8. Meanwhile, when the comb-out processing is performed, "0" is applied as the control signal to the selector 8 and the selector 8 is switched to terminal b and the 8-bits of "0" are output through the selector 8.

Figure 4:
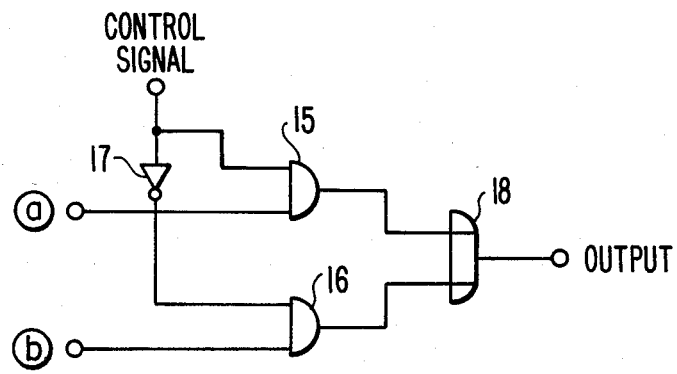
FIG. 4 illustrates details of the selector 8 of FIG. 2(a)

FIG. 4 illustrates the details of selector 8 shown of FIG. 3. When the control signal is "1", AND gate 15 opens and the signal from terminal ⓐ is output through OR circuit 18. When the control signal is "0", the signal "1" is applied to AND gate 16 through inverter 17 and, as a result, the signal from terminal ⓑ output through the AND gate 16 and the OR gate 18.

Figure 5:
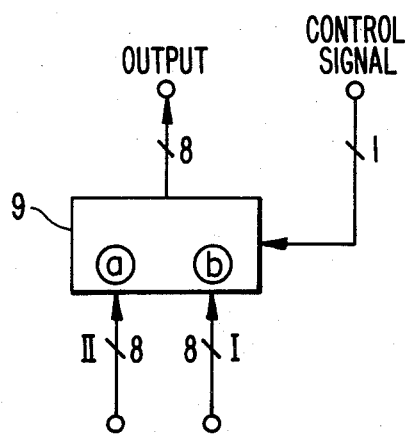
FIG. 5 is a block diagram of a selector 9 of FIG. 2(a)

FIG. 5 illustrates an example of the selector 9 shown of FIG. 2. During the normal mode, the selector 9 is switched to terminal ⓐ, that is, when "1" is applied as the control signal from the control circuit 10 and the signal from the side II of FIG. 2, which is the signal from the 8-bit variable delay circuit 6 is output through the selector 9. When "0" is applied as the control signal during comb-out processing, the selector 9 is switched to terminal ⓑ and the signal from the side I in FIG. 2 which is the 8-bit signal from the frame memory 5 is output through the selector 9 resulting in the previous picture continuously recirculating through the frame memory 5 via adder 4. The selector 9 has the same interior circuit details as the selector 8 illustrated in FIG. 4.

Figure 6:
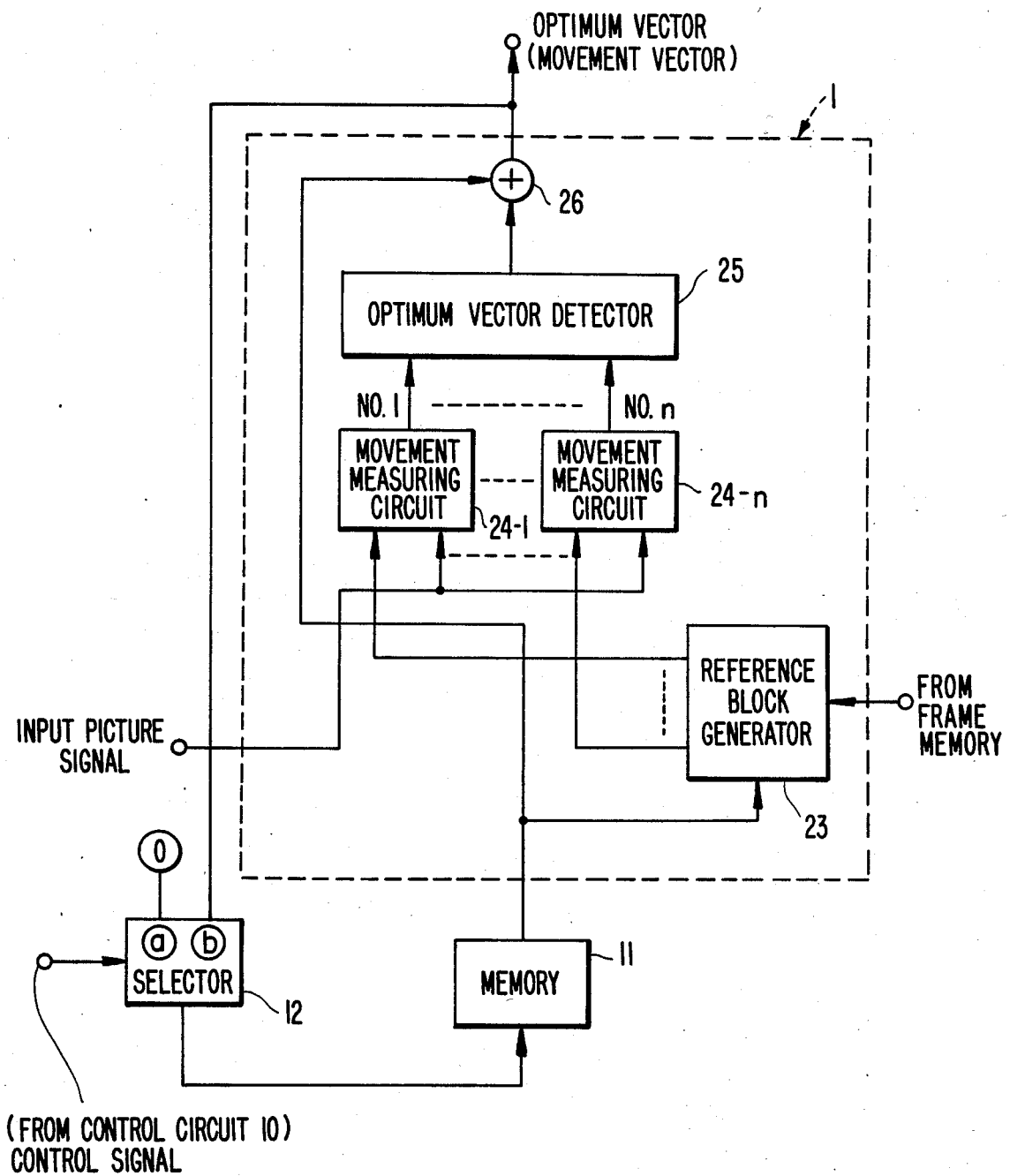
FIG. 6 is a block diagram of a movement vector detector 1 of FIG. 2(a)

FIG. 6 illustrates the details of the movement vector detector 1 of FIG. 2(a). In FIG. 6, the selector 12, which can be a circuit such as shown in FIG. 4, is switched to the side of terminal ⓐ when "1" is applied from control circuit 10 as the control signal during the normal mode and "0" is applieId to the memory 11 and, simultaneously, "0" is applied as the initial value to the reference block generator 23. The input picture signal blocks are applied to movement measuring circuits 24-1 ... 24-n. The reference block generator 23 also generates the signal of the block corresponding to the input signal block of the previous frame from memory 11 as the reference block since "0" is applied from memory 11. The reference block generator 23 consists of an aggregation of n blocks having the same size as the reference block and the initial value gives, for example, the center position. The movement measuring circuits 24-1 ... 24-n detect movement between each block of the reference block and the input picture signal block and inputs the result of detection to the optimum vector detector 25. In the optimum vector detector 25, the minimum value from the results of detection of movement by the movement measuring circuits 24-1 ... 24-n is determined and a deviation from the reference block is generated as an amount of movement vector from the number of the movement measuring circuit which has generated the minimum value. This deviation signal is added to the initial value ("0" in this case) by the adder 26 and the desired movement vector $V_{opt}$ which is the optimum generated.

Meanwhile, since the selectors 12 receives the control signal "0" from the control circuit 10 during the comb-out operation, it is switched to the side of terminal b and the optimum vector $V_{opt}$ is stored in the memory 11. When the next picture signal blocks are input, the movement measuring circuits 24-1 ... 24-n detect the movement difference between the reference blocks generated by the reference block generator 23 and input picture signal blocks. In this case, since a movement vector of the preceding picture stored in the memory 11 is input as the initial value to the reference block generator 23, the reference block is generated with reference to such value. The movement measuring circuits 24-1 ... 24-n, optimum vector detector 25 and adder 26 calculate the movement vector $V_{opt}$, and the movement vector $V_{opt}$ is fed back to the memory 11 through the selector 12, updating the stored value. The thus stored movement vector is the sum of the previously stored movement vector and the new movement, that is, while the comb-out processing is thus carried out as explained above, the movement vector is sequentially accummulated. Since the movement vector $V_{opt}$ is detected by comparing the reference block based on the preceding picture with the input picture signal block, the initial value for generating the reference block must be determined on the basis of the preceding picture. Therefore, at the time of switching from the encoding mode, the initial value from the selector 12 is delayed for as long as one frame by the memory 11 and is supplied to the reference block generator 22 and the adder 26.

Figure 7:
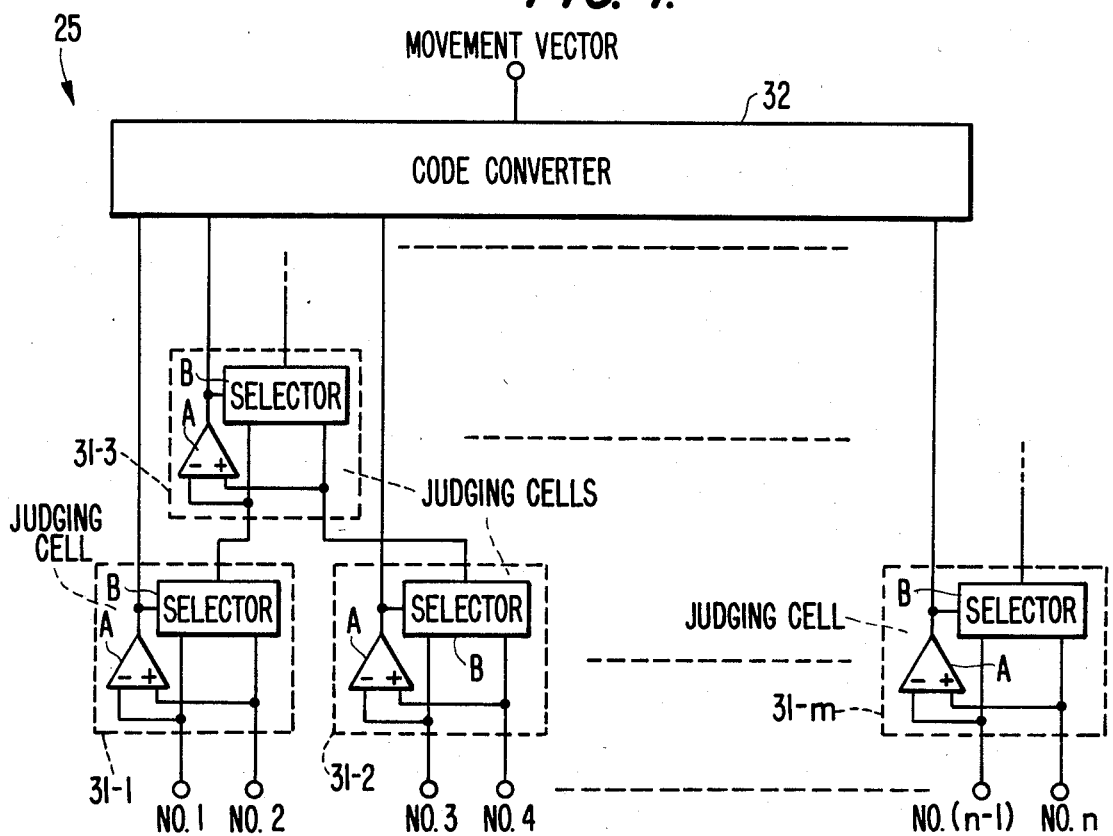
FIG. 7 is a block diagram of an optimum vector detector 25 of FIG. 6.

FIG. 7 shows in detail the optimum vector detector 25 of the movement vector detector 1 in FIG. 6. In FIG. 7, the judging cells 31-1, 31-2, ... ,31-m, respectively, receive the signals from the two adjacent detectors from the lower order of movement measuring circuits 24-1 ... 24-n shown in FIG. 6. The judging cell 31-1 has a comparator A, and a selector B which is controlled by an output of the comparator A as shown in FIG. 7 and which can be a circuit such as shown in FIG. 4. The comparator A compares amplitudes of outputs of the first movement measuring circuit 24-1 and the second movement measuring circuit 24-2 and outputs, for example, "0" to the code converter 32 as the judged output when the lower order circuit 24-1 provides a larger output, or "1" when the upper order circuit 24-2 provides a larger output. Simultaneously, the signal of the movement measuring circuit having the smaller output is output as the selection output through the selector B by controlling the selector B. The selection signal produced by the comparator A is also output to the code converter 32 indicating that the input values are not equal. The other judging cells all have a similar structure. For the next judging cell 31-2 in the first stage, the output amplitudes of the third and fourth movement measuring circuits are compared in the same way and the judged output is supplied to the code converter 32 and simultaneously, the signal of movement measuring circuits 24-3 and 24-4 providing the smaller output is output as the selection output. In the same way, the judging output of signal amplitudes of the adjacent movement measuring circuits 24 are sequentially output to the code converter 32 by the judging cells of the first stage arranged sequentially up to the judging cell 31-m.

The judging cell 31-3 of the second stage compares the selection outputs of the judging cells 31-1, 31-2 and outputs "0" to the code converter 32 as the judging output, for example, when the selection output of judging cell 31-1 of the lower order is larger, or "1" when the selection output of judging cell 31-2 of the higher order is larger. Simultaneously, it outputs the selection output of the judging cell. The other judging cells of the second stage a1.1 output sequentially the judging output of selected output amplitudes of the adjacent cells in the first stage similar to the code converter 32 and also output the smaller selection output of the judging cells in the preceeding stage as the selection output.

Each cell in the stages subsequent to the second stage (not shown) also have a similar structure, and each outputs sequentially the judged amplitude output of selection output of adjacent cells of a preceding stage to the code converter 32 and, simultaneously, the larger selection outputs of the judging cells in the preceding stage as the selection output.

As described above, the judging outputs of many judging cells are input in sequence to the code converter 32 and, therefore, the input as a whole becomes a binary pattern having a constant number of bits. The coder converter 32 has a first read-only-memory (ROM) which stores an output for all patterns to be input and produces the number of the movement measuring circuit 31 input pattern as an address outputting the number. The code converter 32 has a second ROM which converts the movement measuring circuit number data a into displacement (vector amount) by using the number as an address, where the displacement indicates the positional relationship between the comparison (input picture) block and the reference block for which the minimum value is detected.

Figure 8:
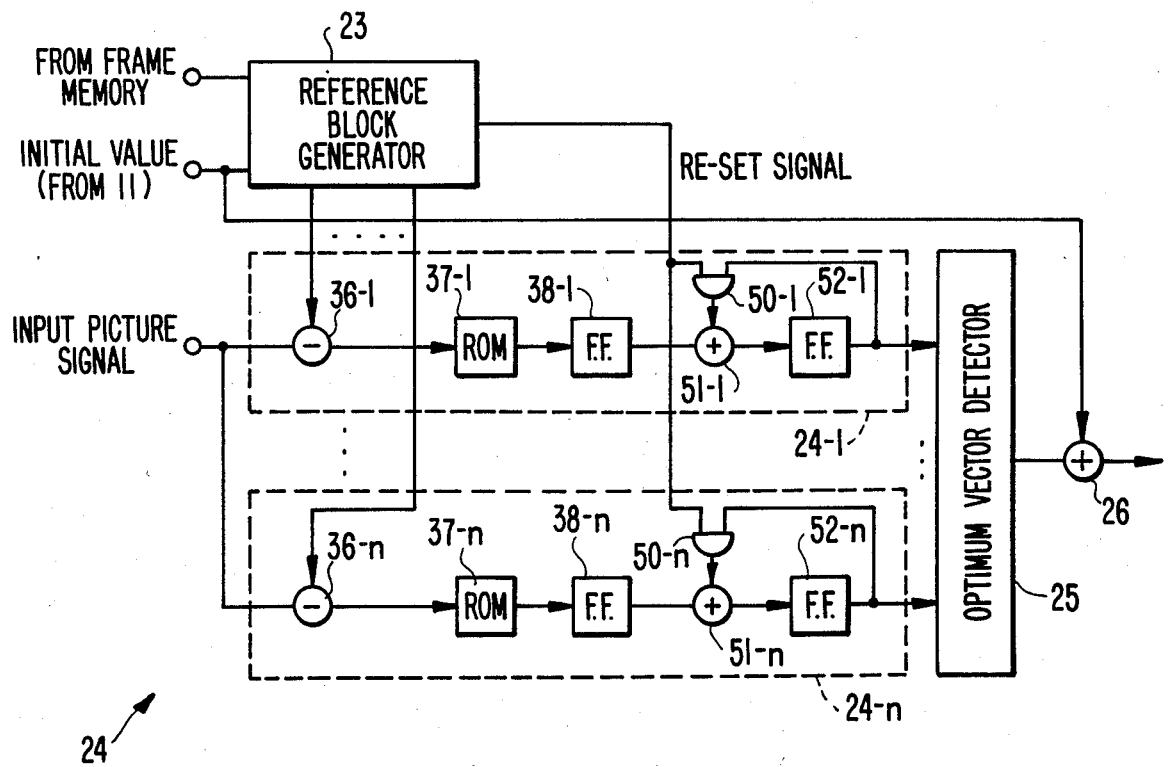
FIG. 8 is a block diagram of a movement measuring circuit 24 of FIG. 6.

Fig! 8 illustrates the details of each movement measuring circuit 24 of FIG. 6. In FIG. 8, if each block is composed of n-bits, subtractors 36-1 ... 36-n subtracts the input picture signal block from the corresponding picture element sent from the reference block generator 23 and outputs the difference between them. ROMs 37-1 ... 37-n are supplied with the difference from the subtractors 36-1 ... 36-n and convert the difference signal to an absolute value using the difference as an address to output the absolute value. FF38-1 ... 38-n, AND circuits 501 ... 50n, adder 511 ... 51n and FF521 ... 52n form an accumulator which accumulates output signals from ROMs 37-1 ... 37-n. These circuits accumulate only one block of data and output an accumulated value to the optimum vector detector 25 because reset signals are applied to AND circuits 50 from reference block generator 23 which reset the accumulated value at each new comparison.

Figure 9A:
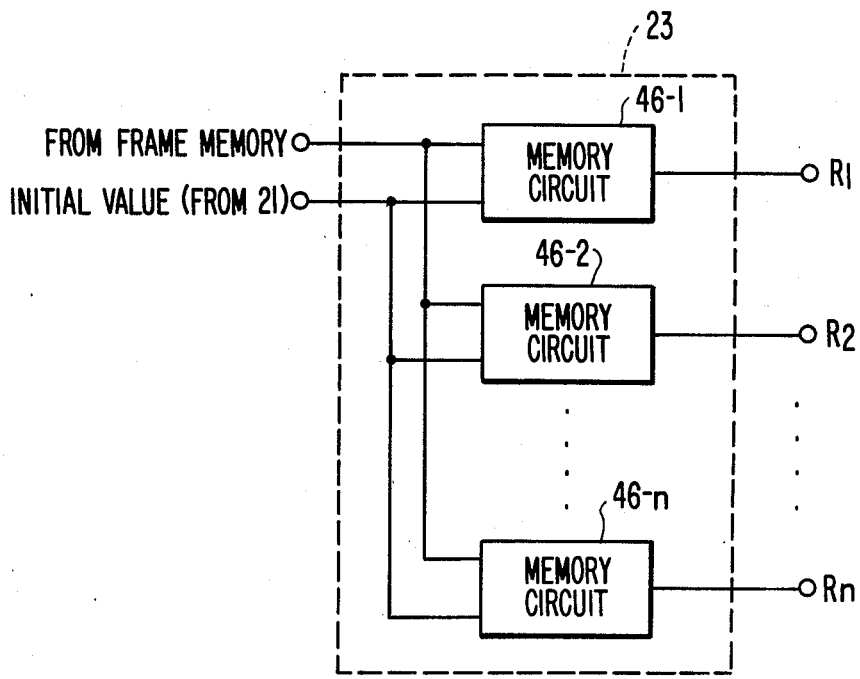
FIG. 9(a) is a block diagram of a comparision block generator 23 of FIG. 6.

FIG. 9(a) shows the detailed structure of the reference block generatbr 23 of FIG. 6. The reference block generator 23 consists of plural memory circuits 46-1 .. . 46-n, in which the number of the memory circuits is the same as a number of reference blocks. The initial value is used as an address to output the refernece blocks which are stored from the frame memory 5.

Figure 9B:
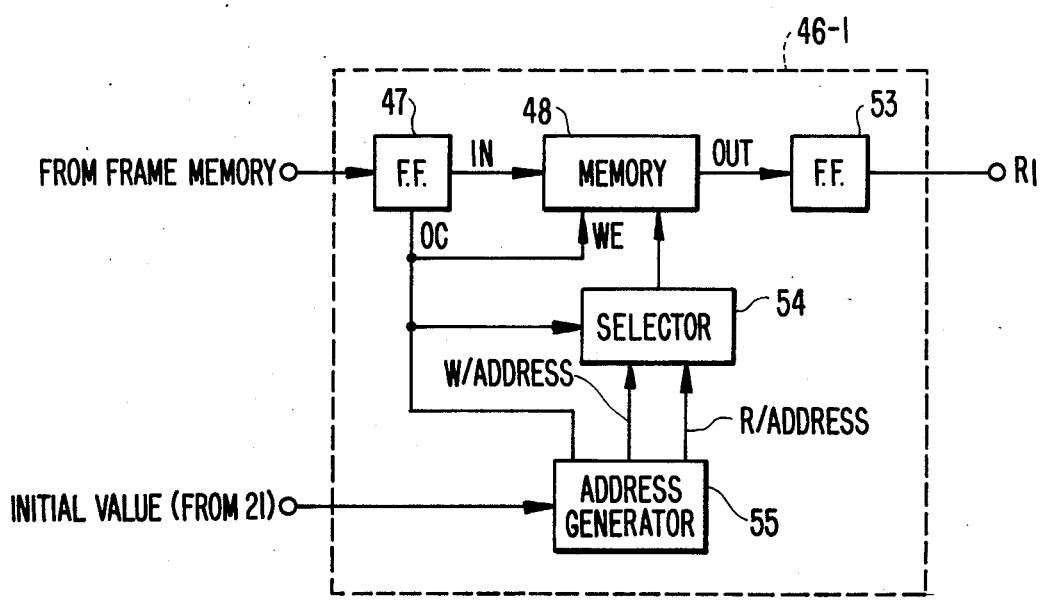
FIG. 9(b) is a block diagram of a memory circuit 46 of FIG. 9(a).

FIG. 9(b) shows a detailed structure of the memory circuit 46 of FIG. 9(a). Address generator 55 generates an output control signal (OC) to FF47, a write enabling signal WE to memory 48 and address signals for writing/reading the memory 48 according to the initial value from memory 11. The address signals from the address generator 55 are selected as a writing or reading address by selector 54 according to the write enable signal from address generator 55.

For the memory 11 shown in FIG. 6, any memory can be used which can store the vector values for one frame and which can be used to attain a function similar to that of a delay line.

As described above, an apparatus of the present invention provides a memory for storing movement vector values and thereby updates the content of the memory in accordance with the movement vector detected through detection of the movement vector for each frame with the movement vector value stored in the memory used as the initial value during the comb-out processing where encoding of the picture signal is not carried out and detects a movement vector using the movement vector value stored in the memory as the initial value during the encoding operation. Accordingly, an encoder of the present invention is not increased in scale and the range for detecting the movement vector is not expanded even when the interval between pictures that are encoded before and after the comb-out processing is widened.

The many features and advantages of the present invention are apparent from the detailed specification and, thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. An apparatus for band compression processing of a picture signal, comprising:
   forecasting error signal generation means for generating a forecasting error signal from a difference between an input picture signal and a forecasted value;
   movement vector generation means for generating a movement vector from a comparison between input picture signal blocks and reference of blocks of a preceding picture signal; and
   update means, operatively connected to said movement vector generation means, for updating an initial value of said movement vector during a comb-out operation.

2. An apparatus according to claim 1, wherein said movement vector generation means comprises:
   reference block generation means, operatively connected to said forecasting error signal generation means, for generating a reference block from the forecasted value and forecasting error signal; and
   comparison means, operatively connected to said reference block generation means, for comparing the input picture signal blocks with the reference blocks and generating the movement vector.

3. An apparatus according to claim 2, wherein said reference block generation means includes means for generating a new picture signal corresponding to a preceding picture from the forecasted value and forecasting error signal, wherein the forecasted value is formed by moving the preceding picture according to the movement vector.

4. An apparatus according to claim 1, further comprising:
   storage means, operatively connected to said forecasting error signal generation means, for storing the forecasting error signal and for outputting the forecasting error signal at a rate corresponding to a rate of transmission path; and
   supervision means, operatively connected to said storage means, for supervising said storage means and for controlling the comb-out operation to prevent overflow of said storage means.

5. An apparatus accotding to claim 4, further comprising:
   first interception means, operatively connected to said forecasting error signal generation means and said storage means, and controlled by an output of said supervision means, for intercepting to provide the forecasting error signal for said storage means during the comb-out operation; and
   second interception means, operatively connected to said forecasting error signal generation means, and controlled by an output of said overvision means, for intercepting to provide the forecasted value for said forecasting error signal generation means and providing the preceding picture during the comb-out operation.

6. An apparatus according to claim 5, wherein said update means comprises memory means, operatively connected to said movement vector generation means, for memorizing and updating the movement vector during the comb-out operation and for providing an updated movement vector for said forecasting error signal generation means at the first operation thereof after the combout operation.

7. A band compression apparatus for processing a picture signal during comb-out processing, comprising:
   movement vector generation means for generating a movement vector indicating a difference in movement between a present picture signal and a previous picture signal; and
   accumulation means, operatively connected to said movement vector generation means, for accumulating movement vectors during the comb-out processing.

8. An apparatus according to claim 7, further comprising forecasting error signal generation means, operatively connected to said movement vector generation means, for producing a forecasted error signal from the accumulated movement vector and the present picture signal at the end of comb-out processing.

9. An apparatus according to claim 7, further comprising recirculation means, operatively connected to said movement vector generation means, for recirculating the previous picture signal and applying the recirculated previous picture signal to said movement vector generation means.

10. An apparatus according to claim 9, wherein said recirculation means comprises:
 a frame memory operatively connected to said movement vector generation means; and
 a selector having inputs operatively connected to said frame memory and said movement vector generation means and an output operatively connected to said frame memory, for selecting the input from said frame memory during comb-out processing.

11. An apparatus according to claim 7, wherein said accumulation means comprises:
 a selector operatively connected to said movement vector generation means; and
 an accumulating memory, operatively connected to said selector and said movement vector generation means, for accumulating the movement vectors.

* * * * *

UNITED STATES PATENT AND TRADEMARK OFFICE
CERTIFICATE OF CORRECTION

PATENT NO. : 4,668,987
DATED : May 26, 1987
INVENTOR(S) : Kiichi Matsuda, et al

It is certified that error appears in the above-identified patent and that said Letters Patent is hereby corrected as shown below:

Item 73    change "Kanagawa" to  -- Kawasaki-Shi --.

Column 1, line 40, change "genefated" to --generated--.

Column 5, line 63, change "accummulated" to --accumulated--.

Column 6, line 4, change "accummulated" to --accumulated--;
          line 13, change "mulated" to  -- ulated --.

Column 7, line 8, change "applieed" to --applied--.

Column 8, line 37, change "al.1" to --all--;
          line 41, change "preceeding" to --preceding--;
          line 64, change "Fig!" to --Fig.--.

Column 9, line 15, change "generatbr" to --generator--.

Column 10, line 60, change "combout" to --comb-out--.

Signed and Sealed this

First Day of December, 1987

*Attest:*

DONALD J. QUIGG

*Attesting Officer*    *Commissioner of Patents and Trademarks*